United States Patent
Liu

(10) Patent No.: US 9,210,612 B2
(45) Date of Patent: Dec. 8, 2015

(54) COMMUNICATION SYSTEM, METHOD AND DEVICE

(71) Applicant: Huawei Technologies Co., LTD, Shenzhen (CN)

(72) Inventor: Yang Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 191 days.

(21) Appl. No.: 13/961,590

(22) Filed: Aug. 7, 2013

(65) Prior Publication Data
US 2013/0324137 A1 Dec. 5, 2013

Related U.S. Application Data

(63) Continuation of application No. PCT/CN2011/082960, filed on Nov. 25, 2011.

(51) Int. Cl.
*H04W 28/08* (2009.01)
*H04W 88/08* (2009.01)

(52) U.S. Cl.
CPC ............ *H04W 28/08* (2013.01); *H04W 88/085* (2013.01)

(58) Field of Classification Search
USPC ............................ 455/436, 453; 370/252, 312
See application file for complete search history.

(56) References Cited

U.S. PATENT DOCUMENTS

| 2011/0053598 A1* | 3/2011 | Ahluwalia | 455/436 |
| 2012/0039208 A1* | 2/2012 | Aydin | 370/252 |
| 2012/0281556 A1* | 11/2012 | Sayana et al. | 370/252 |

FOREIGN PATENT DOCUMENTS

| CN | 101136811 A | 3/2008 |
| CN | 101150348 A | 3/2008 |
| CN | 101217716 A | 7/2008 |
| CN | 101232653 A | 7/2008 |
| CN | 101841935 A | 9/2010 |
| CN | 101938285 A | 1/2011 |
| EP | 2234283 A1 | 9/2010 |

OTHER PUBLICATIONS

Chinese Office Action received in Application No. 201180003153.6, mailed May 26, 2014, 11 pages.

* cited by examiner

*Primary Examiner* — David Q Nguyen
(74) *Attorney, Agent, or Firm* — Slater & Matsil, L.L.P.

(57) ABSTRACT

A communication system and method are provided. The communication system includes a master base station, a slave base station and a remote radio unit (RRU); where a cell controlled by the slave base station is included in cells controlled by the master base station. The master base station is configured to receive downlink data and send the downlink data to the slave base station; and the slave base station corresponds to a transmission channel identifier of the downlink data. The slave base station is configured to receive the downlink data sent by the master base station, convert the downlink data into air interface downlink vector data, and send the air interface downlink vector data to the RRU. The RRU is configured to convert the air interface downlink vector data into analog data and send the analog data to a user equipment, thereby realizing data transmission.

25 Claims, 4 Drawing Sheets

US 9,210,612 B2

COMMUNICATION SYSTEM, METHOD AND DEVICE

CROSS-REFERENCE TO RELATED APPLICATIONS

This application is a continuation of International Application No. PCT/CN2011/082960, filed on Nov. 25, 2011, which is hereby incorporated by reference in its entirety.

TECHNICAL FIELD

The present disclosure relates to the field of communications technologies, and in particular, to a communication system, method and device.

BACKGROUND

Existing long term evolution (LTE) network system adopts flat network architecture, including two-layer frameworks which are a core network and a radio access network, where a base station in the radio access network may be configured to manage air interface resources. If the air interface resources are limited, there is a need to expand a cell or the base station. Accordingly, a family micro-station such as a 100 milliwatts (mw) micro-station (PICO) or 10 mw micro-station (FEMTO) emerges. Each base station may be connected to one or more remote radio units (RRUs), where each RRU corresponds to one cell, and the base station is connected to the RRU by using a fiber and vector data (for example, IQ data) is transmitted therebetween.

In a case that one base station corresponds to a plurality of cells, a plurality of RRUs connected to the base station may respectively convert uplink data received into vector data. The vector data is transmitted to the base station to perform Layer 1 and Layer 2 processing, and then sent to the core network.

It can be seen that, the number of cells will also increase sharply with a sharp increase of the number of base stations, that is, an increase of air interface resources. In this way, the management burden of cell management equipment on the cells is heavier.

SUMMARY OF THE INVENTION

Embodiments of the present disclosure provide a communication system, method and device, which will not increase the management burden of cells with an increase of air interface resources.

One aspect of the present disclosure provides a communication system, which includes a master base station, a slave base station and a RRU. A cell controlled by the slave base station is included in cells controlled by the master base station. The master base station is configured to receive downlink data and send the downlink data to the slave base station. The slave base station corresponds to a transmission channel identifier of the downlink data. The slave base station is configured to receive the downlink data sent by the master base station, to convert the downlink data into air interface downlink vector data, and to send the air interface downlink vector data to the RRU. The RRU is configured to convert the air interface downlink vector data into analog data and to send the analog data to a user equipment.

Another aspect of the present disclosure provides a communication system, which includes a master base station and a RRU. A cell controlled by the RRU is included in cells controlled by the master base station. The master base station is configured to receive downlink data and send the downlink data to the RRU. The RRU corresponds to a transmission channel identifier of the downlink data. The RRU is configured to receive the downlink data, to convert the downlink data into air interface downlink vector data, to convert the air interface downlink vector data into analog data, and to send the analog data to user equipment.

Another aspect of the present disclosure provides a slave base station, which includes a transceiver and a processor. The transceiver is configured to receive downlink data sent by a master base station. The processor is configured to convert the downlink data received by the transceiver into air interface downlink vector data. The transceiver is further configured to send the air interface downlink vector data to a RRU so that the RRU converts the air interface downlink vector data into analog data and sends the analog data to a user equipment. A cell controlled by the slave base station is included in cells controlled by the master base station.

Another aspect of the present disclosure provides a RRU, which includes a first transceiver, a processor and a second transceiver. The first transceiver is configured to receive downlink data sent by a master base station. The processor is configured to convert the downlink data received by the first transceiver into air interface downlink vector data. The second transceiver is configured to convert the air interface downlink vector data into analog data and to send the analog data to a user equipment. A cell controlled by the RRU is included in cells controlled by the master base station.

Another aspect of the present disclosure provides a master base station, which includes a transceiver and a processor. The transceiver is configured to receive downlink data. The processor is configured to encapsulate the downlink data. The transceiver is further configured to send the encapsulated downlink data to a slave base station or a RRU. The slave base station or the RRU corresponds to a transmission channel identifier of the downlink data. A cell controlled by the slave base station or the RRU is included in cells controlled by the master base station.

Another aspect of the present disclosure provides a communication method, which is applied to a system including a master base station, a slave base station and a RRU. A cell controlled by the slave base station is included in cells controlled by the master base station. The method includes receiving, by the master base station, downlink data and sending the downlink data to the slave base station. The slave base station corresponds to a transmission channel identifier of the downlink data. The method also includes converting, by the slave base station, the downlink data into air interface downlink vector data and sending the air interface downlink vector data to the RRU. The RRU converts the air interface downlink vector data into analog data, and sending the analog data to a user equipment.

Another aspect of the present disclosure further provides a communication method, which is applied to a system including a master base station and a RRU; where a cell controlled by the RRU is included in cells controlled by the master base station. The method includes receiving, by the master base station, downlink data, and sending the downlink data to a corresponding RRU, where the RRU corresponds to a transmission channel identifier of the downlink data, and converting, by the RRU, the downlink data into air interface downlink vector data, converting the air interface downlink vector data into analog data, and sending the analog data to a user equipment.

In the communication system according to the technical solution, a master base station sends downlink data to a corresponding slave base station; the slave base station converts the downlink data into air interface downlink vector data (that is, performing Layer 1 and Layer 2 baseband processing for the downlink data), and sends the air interface downlink vector data to the RRU; and finally the RRU sends the downlink data processed by the slave base station to the user equipment. In this way, the master base station may connect to a plurality of slave base stations, the slave base station is connected to the RRU, and a cell controlled by the slave base station is included in cells controlled by the master base station. Therefore, the slave base stations may be dynamically added (that is, the connected RRUs are increased, and therefore air interface resources are increased) according to the cells supported by the master base station. However, the number of cells will not increase; therefore, the management burden of the cells will not increase.

In another communication system according to the technical solution, a master base station sends downlink data to a corresponding RRU; the RRU converts the downlink data into air interface downlink vector data, and converts the air interface downlink vector data into analog data and sends the analog data to a user equipment. In this way, the master base station may connect to a plurality of RRUs and a cell controlled by the RRU is included in cells controlled by the master base station. Therefore, the RRUs may be dynamically added according to the cells supported by the master base station. Due to an added function of Layer 1 and Layer 2 baseband processing (that is, the downlink data is converted into the air interface downlink vector data) in the RRU according to the embodiments, with the increase of the RRUs, air interface resources will also increase. However, the number of cells will not increase; therefore, the management burden of the cells will not increase.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and persons of ordinary skill in the art may still derive other drawings from the accompanying drawings without creative efforts.

DETAILED DESCRIPTION OF ILLUSTRATIVE EMBODIMENTS

The following clearly and describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
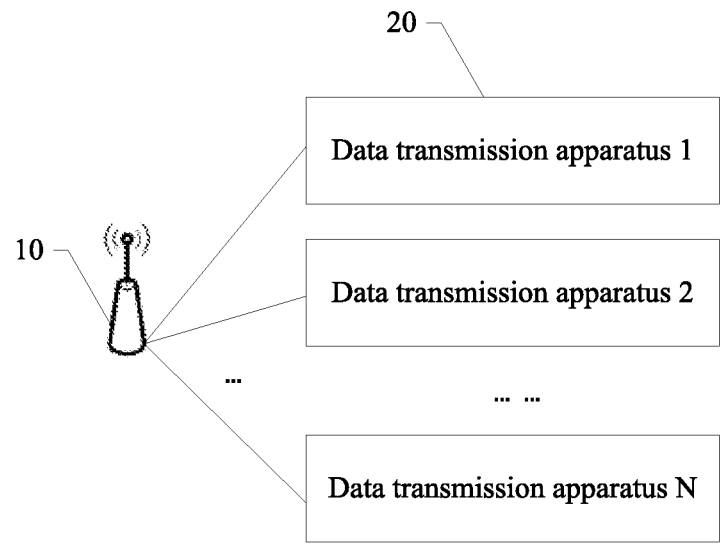
FIG. 1 is a schematic structural diagram of a communication system according to an embodiment of the present disclosure.

An embodiment of the present disclosure provides a communication system. A schematic structural diagram of the communication system is shown in FIG. 1. The communication system includes a master base station 10 and at least one data transmission apparatus 20, where the master base station 10 and a plurality of data transmission apparatuses 20 may be connected by using a network (for example, Ethernet). In addition, the master base station 10 may be connected to a core network in the uplink and connected to a plurality of data transmission apparatuses 20 in the downlink. The data transmission apparatus 20 is connected to a user equipment in the downlink. In the embodiments of the present disclosure, the term "uplink" refers to a path from a user equipment to a base station and then to a core network, and the term "downlink" refers to a path from a core network to a base station and then to a user equipment. A cell controlled by the data transmission apparatus 20 is included in cells controlled by the master base station 10, that is, the cell controlled by the data transmission apparatus 20 is one of a plurality of cells controlled by the master base station 10, or the cell controlled by the data transmission apparatus 20 is a part of a cell controlled by the master base station 10.

The master base station 10 in this embodiment may be configured to receive downlink data sent by the core network and send the downlink data to the data transmission apparatus 20 corresponding to a transmission channel identifier of the downlink data. Optionally, the master base station 10 is further configured to forward uplink data sent by the data transmission apparatus 20 to the core network.

Optionally, the transmission channel identifier may uniquely identify a channel for transmitting the downlink data. For example, the transmission channel identifier may be an interface address of the data transmission apparatus or may be an identifier of a transmission tunnel, and the like. The master base station 10 may learn, according to the transmission channel identifier, to which data transmission apparatus 20 the downlink data needs to be sent. The transmission channel identifier is stored in the master base station 10 when the user equipment establishes a link with the core network via the master base station 10.

The data transmission apparatus 20 in this embodiment may be configured to receive downlink data sent by the master base station 10 and send the downlink data to the user equipment by air interface. Optionally, the data transmission apparatus 20 may be further configured to receive uplink data that is sent by air interface by the user equipment and send the uplink data to the master base station 10.

Optionally, the master base station 10, after receiving the downlink data sent by the core network, may encapsulate the downlink data according to a certain definition or a certain standard protocol, and send the encapsulated downlink data to the corresponding data transmission apparatus 20. Correspondingly, the data transmission apparatus 20 may forward the received downlink data to an air interface protocol stack in the data transmission apparatus 20. The air interface protocol stack performs Layer 1 (L1) baseband processing for the downlink data to generate air interface downlink vector data. The air interface downlink vector data may be converted into analog data, and then the analog data may be sent by air interface.

When the data transmission apparatus 20 receives the uplink data that is sent by air interface by the user equipment, the data transmission apparatus 20 converts the uplink data into air interface uplink vector data, demodulates the air interface uplink vector data in Layer 1 and decapsulates the air interface uplink vector data by using an air interface protocol stack of Layer 2, and sends the demodulated and decapsulated air interface uplink vector data to the master base station 10. The master base station 10 encapsulates the uplink data sent by the data transmission apparatus 20 according to a certain definition or a certain standard protocol, and sends the uplink data to the core network.

Figure 2:
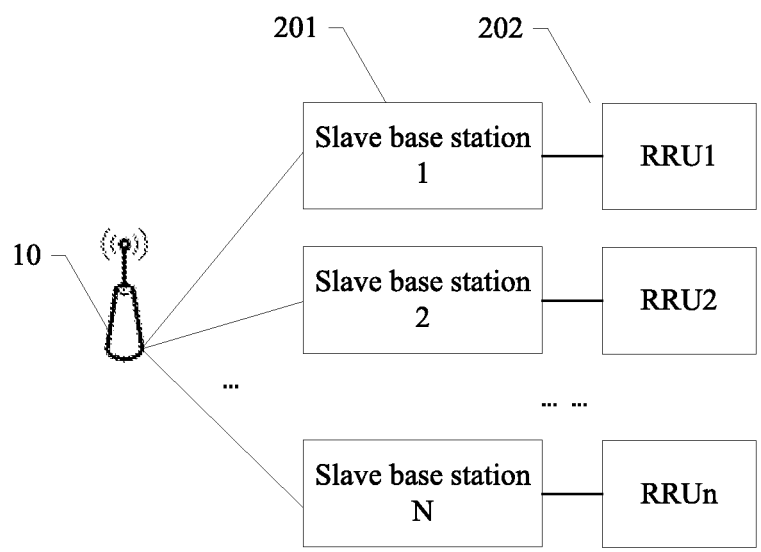
FIG. 2 is a schematic logical structural diagram of another communication system according to an embodiment of the present disclosure.

In one case, the communication system shown in FIG. 2 includes a master base station 10 and at least one data transmission apparatus 20. Each data transmission apparatus 20 may include a slave base station 201 and an RRU 202, where a cell controlled by the slave base station 201 is included in cells controlled by the master base station 10. That is, the cell controlled by the slave base station 201 is one of a plurality of cells controlled by the master base station 10, or the cell controlled by the slave base station 201 is a part of a cell controlled by the master base station 10 (in this case, a plurality of slave base stations 201 may share one cell controlled by the master base station 10).

The master base station 10 is configured to receive downlink data and send the downlink data to the slave base station 201. The slave base station 201 corresponds to a transmission channel identifier of the downlink data. The slave base station 201 is configured to receive the downlink data sent by the master base station 10, convert the downlink data into air interface downlink vector data, and send the air interface downlink vector data to the RRU 202. The RRU 202 is configured to convert the air interface downlink vector data into analog data, and send the analog data to the user equipment.

Further, the RRU 202 is configured to convert the uplink data sent by the user equipment into air interface uplink vector data and send the air interface uplink vector data to the slave base station 201. The slave base station 201 is further configured to demodulate and decapsulate the air interface uplink vector data sent by the RRU 202, and send the demodulated and decapsulated air interface uplink vector data to the master base station 10. The master base station 10 is further configured to forward the uplink data sent by the slave base station 201.

Optionally, a data transmission delay may be shortened by deploying the slave base station 201 close to the RRU 202, that is, the distance between the slave base station 201 and the RRU 202 is shorter than a preset range (such as 100 m); the slave base station 201 and the RRU 202 may be connected to each other by using a fiber. Further, if one slave base station 201 is only connected to one RRU 202, compared with the case where one base station may be connected to a plurality of RRUs in the prior art, the slave base station 201 in this embodiment may save processing of performing management and resource scheduling on a plurality of RRUs 202.

Further, the master base station 10 in this embodiment may be further configured to manage information of at least one slave base station 201 connected to the master base station 10, the information including information of a cell controlled by the slave base station 201, information of the RRU 202 connected to the slave base station 201, and the like. Moreover, the master base station 10 may further detect signals of a plurality of cells controlled by the master base station, and store information reported by the user equipments in the plurality of cells.

It should be noted that, in this embodiment, the slave base station 201 has only functions of performing Layer 1 and Layer 2 baseband processing (that is, processing such as converting the downlink data into air interface downlink vector data, and demodulating and decapsulating the air interface uplink vector data, and the like) for the uplink data and the downlink data, and connecting to the master base station 10, but does not have a function of connecting to a core network in the uplink.

It can be seen that, in the communication system according to this embodiment, the master base station sends the downlink data to the corresponding slave base station, the slave base station performs Layer 1 and Layer 2 baseband processing for the downlink data and sends the downlink data processed by the slave base station to the RRU, and then the RRU sends the downlink data processed by the slave base station to the user equipment. The slave base station receives the uplink data, performs Layer 1 and Layer 2 baseband processing for the uplink data and sends the uplink data processed by the slave base station to the master base station; and the master base station forwards the received uplink data. In this way, the master base station may connect to a plurality of slave base stations, the slave base station is connected to the RRU, and the cell controlled by the slave base station is included in the cells controlled by the master base station. Therefore, the slave base stations may be dynamically added (that is, the connected RRUs are increased, and therefore air interface resources are increased) according to the cells supported by the master base station. However, the number of cells will not increase; therefore, the management burden of the cells will not increase. Further, as the number of cells will not increase, the number of cell handovers will not increase.

Figure 3:
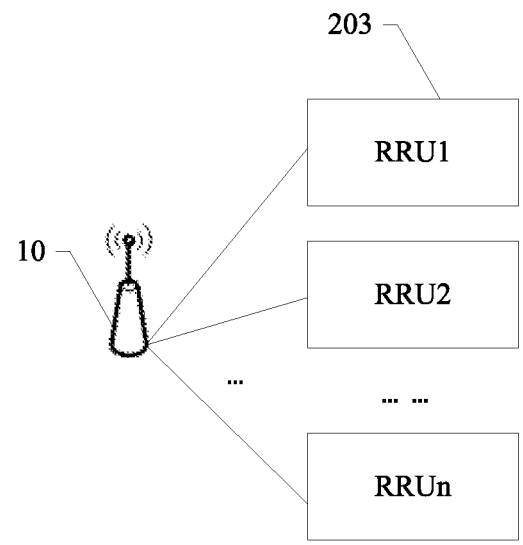
FIG. 3 is a schematic logical structural diagram of another communication system according to an embodiment of the present disclosure.

Referring to FIG. 3, in another case, a communication system may include a master base station 10 and at least one data transmission apparatus 20. Each data transmission apparatus 20 may be an RRU 203, where a cell controlled by the RRU 203 is included in cells controlled by the master base station 10. That is, the cell controlled by the RRU 203 is one of a plurality of cells controlled by the master base station 10, or the cell controlled by the RRU 203 is a part of a cell controlled by the master base station 10 (in this case, a plurality of the RRUs 203 can share one cell controlled by the master base station 10).

The master base station 10 is configured to receive downlink data and send the downlink data to the RRU 203. The RRU 203 corresponds to a transmission channel identifier of the downlink data, and is configured to receive downlink data, convert the downlink data into air interface downlink vector data, convert the air interface downlink vector data into analog data, and send the analog data to a user equipment.

Optionally, the RRU 203 in this embodiment may be further configured to convert uplink data sent by the user equipment into air interface uplink vector data, demodulate and decapsulate the air interface uplink vector data, and send the demodulated and decapsulated air interface uplink vector data to the master base station 10. The master base station 10 may be further configured to forward the uplink data sent by the RRU 203.

Further, the master base station 10 in this embodiment may be further configured to manage information of at least one RRU 203 connected to the master base station 10, the information including information of a cell controlled by the RRU 203, and the like. Moreover, the master base station 10 may further detect signals of a plurality of cells controlled by the master base station, and store information reported by the user equipments in the plurality of cells.

It should be noted that the master base station 10 and the RRU 203 in this embodiment may be connected by using a network (for example, Ethernet) rather than a fiber.

In this embodiment, the RRU 203 is used as a data transmission apparatus 20. Each RRU 203 may independently perform Layer 1 and Layer 2 baseband processing for the uplink data and the downlink data. For example, the RRU 203 may demodulate and decapsulate the uplink data and convert the downlink data into the air interface downlink vector data. Compared with the case in the prior art where a plurality of RRUs converts the uplink data into vector data and centralize the vector data in one base station to perform Layer 1 and Layer 2 processing, performing Layer 1 and Layer 2 processing respectively by each RRU 203 in this embodiment reduces the burden of the master base station in performing Layer 1 and Layer 2 processing.

It should be noted that the master base station 10 may be a base station which is added with a function of connecting to and communicating with the data transmission apparatus 20 based on the existing base station, that is, a base station with the function of connecting to and communicating with the data transmission apparatus 20.

It can be seen that, in the communication system according to this embodiment, the master base station sends the downlink data to the corresponding RRU; the RRU performs Layer 1 and Layer 2 baseband processing as well as other processing for the downlink data, and sends the processed downlink data to the user equipment by air interface; moreover, the RRU, after receiving the uplink data and performing the Layer 1 and Layer 2 baseband processing as well as other processing for the uplink data, sends the uplink data to the master base station; and the master base station forwards the received uplink data. In this way, the master base station may connect to a plurality of RRUs, and the cell controlled by the RRU is included in the cells controlled by the master base station. Therefore, the RRUs may be dynamically added according to the cells supported by the master base station. Because the RRU in this embodiment is added with the function of Layer 1 and Layer 2 baseband processing, air interface resources will also increase with the increase of the RRUs. However, the number of cells will not increase; therefore, the management burden of the cells will not increase.

Further, as the number of cells will not increase, the number of cell handovers will not increase. Moreover, in this embodiment, if the air interface resources need to be expanded, the air interface resources may be increased by adding the number of RRUs in this embodiment without adding additional base stations (such as family micro-station), thereby simplifying the system structure.

An embodiment of the present disclosure further provides a communication system shown in FIG. 2. The communication system includes a master base station 10 and at least one data transmission apparatus 20. Each data transmission apparatus 20 may further include a slave base station 201 and an RRU 202, where a cell controlled by the slave base station 201 is included in cells controlled by the master base station 10. The master base station 10 is configured to receive downlink data and send the downlink data to the slave base station 201. The slave base station 201 corresponds to a transmission channel identifier of the downlink data. The slave base station 201 is configured to receive the downlink data sent by the master base station 10, convert the downlink data into air interface downlink vector data, and send the air interface downlink vector data to the RRU 202. The RRU 202 is configured to convert the air interface downlink vector data into analog data, and send the analog data to a user equipment.

An embodiment of the present disclosure further provides another communication system shown in FIG. 2. The communication system includes a master base station 10 and at least one data transmission apparatus 20. Each data transmission apparatus 20 may further include a slave base station 201 and an RRU 202, where a cell controlled by the slave base station 201 is included in cells controlled by the master base station 10. The RRU 202 is configured to convert uplink data sent by a user equipment into air interface uplink vector data and send the air interface uplink vector data to the slave base station 201. Moreover, the slave base station 201 is configured to demodulate and decapsulate the air interface uplink vector data sent by the RRU 202, and send the demodulated and decapsulated air interface uplink vector data to the master base station 10. The master base station 10 is configured to forward, to a core network for example, the uplink data sent by the slave base station 201. Optionally, the master base station 10 is further configured to receive downlink data and send the downlink data to the slave base station 201. The slave base station 201 corresponds to a transmission channel identifier of the downlink data. The slave base station 201 is further configured to receive the downlink data sent by the master base station 10, convert the downlink data into air interface downlink vector data, and send the air interface downlink vector data to the RRU 202. The RRU 202 is further configured to convert the air interface downlink vector data into analog data, and send the analog data to a user equipment. Optionally, the master base station 10 is further configured to manage information of the slave base station 201 such as information of the cell controlled by the slave base station 201 and information of the RRU 202 connected to the slave base station 201. Optionally, the cell controlled by the slave base station 201 is one of a plurality of cells controlled by the master base station 10 or a part of a cell controlled by the master base station 10. Optionally, the distance between the slave base station 201 and the RRU 202 is shorter than a preset range.

An embodiment of the present disclosure further provides a communication system shown in FIG. 3. The communication system includes a master base station 10 and at least one data transmission apparatus 20. Each data transmission apparatus 20 may be an RRU 203, where a cell controlled by the RRU 203 is included in cells controlled by the master base station 10. The master base station 10 is configured to receive downlink data and send the downlink data to the RRU 203, The RRU 203 corresponds to a transmission channel identifier of the downlink data, and is configured to receive the downlink data, convert the downlink data into air interface downlink vector data, convert the air interface downlink vector data into analog data, and send the analog data to a user equipment.

An embodiment of the present disclosure further provides a communication system shown in FIG. 3. The communication system includes a master base station 10 and at least one data transmission apparatus 20. Each data transmission apparatus 20 may be an RRU 203, where a cell controlled by the RRU 203 is included in cells controlled by the master base station 10. The RRU 203 is configured to convert uplink data sent by a user equipment into air interface uplink vector data, demodulate and decapsulate the air interface uplink vector data, and send the demodulated and decapsulated air interface uplink vector data to the master base station 10. The master base station 10 is configured to forward the uplink data sent by the RRU 203. Optionally, the master base station 10 is further configured to receive downlink data and send the downlink data to the RRU 203. The RRU 203 corresponds to a transmission channel identifier of the downlink data, and is configured to receive downlink data, convert the downlink data into air interface downlink vector data, convert the air interface downlink vector data into analog data, and send the analog data to a user equipment. Optionally, the master base station 10 is further configured to manage information of the RRU 203 such as information of the cell controlled by the RRU 203. Optionally, the cell controlled by the RRU 203 is one of a plurality of cells controlled by the master base station 10 or the cell controlled by the RRU 203 is a part of a cell controlled by the master base station 10.

It should be noted that the master base station in the communication system may be considered as an existing base station with an added function of connecting to the slave base station or the RRU by using the network. The master base station mainly transmits the downlink data and the uplink data, but does not perform processing for the detailed contents of the data. The slave base station may be considered as an apparatus with a function of connecting to the master base station and functions of performing Layer 1 and Layer 2 baseband processing for the uplink data and the downlink data in the existing base station, but does not have a function of connecting to a core network.

Figure 4:
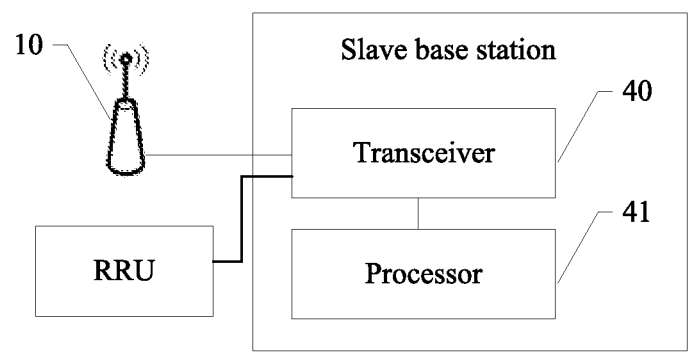
FIG. 4 is a schematic logical structural diagram of another communication system according to an embodiment of the present disclosure.

Referring to a slave base station in a communication system shown in FIG. 4, an embodiment of the present disclosure further provides a slave base station, including a transceiver 40 and a processor 41. The slave base station may be applied in the system shown in FIG. 2. When being applied in the communication system shown in FIG. 2 or FIG. 4, the transceiver 40 in the slave base station may be respectively connected to a master base station 10 and an RRU; and the processor 41 is connected to the transceiver 40. Optionally, the transceiver 40 may realize data receiving and sending via an antenna (not shown in the figure), which will not be described hereafter.

The transceiver 40 and the processor 41 in this embodiment comply with at least one of the following cases.

(1) The transceiver 40 is configured to receive downlink data sent by the master base station 10. The processor 41 is configured to convert the downlink data received by the transceiver 40 into air interface downlink vector data. The transceiver 40 is further configured to send the air interface downlink vector data to the RRU so that the RRU converts the air interface downlink vector data into analog data and sends the analog data to the user equipment by air interface.

(2) The transceiver 40 is configured to receive air interface uplink vector data sent by the RRU, where the air interface uplink vector data is converted by the RRU according to the uplink data sent by the user equipment. The processor 41 is configured to demodulate and decapsulate the air interface uplink vector data sent by the RRU. The transceiver 40 is further configured to send the decapsulated uplink data to the master base station 10.

A cell controlled by the slave base station in this embodiment is included in cells controlled by the master base station.

Optionally, the transceiver 40 in this embodiment may be connected to the RRU by using a fiber. The slave base station in this embodiment may be deployed close to the RRU such as within a range less than 100 m away from the RRU, thereby shortening the data transmission delay.

The slave base station in this embodiment may only perform Layer 1 and Layer 2 baseband processing for the uplink data and the downlink data by using the processor 41, and be connected to the master base station 10 by using the transceiver 40, but does not have the function of connecting to a core network in the uplink. Further, if one slave base station is only connected to one RRU in this embodiment, compared with the case where one base station may connect to a plurality of RRUs in the prior art, the slave base station in this embodiment may save processing of performing management and resource scheduling on a plurality of RRUs.

Figure 5:
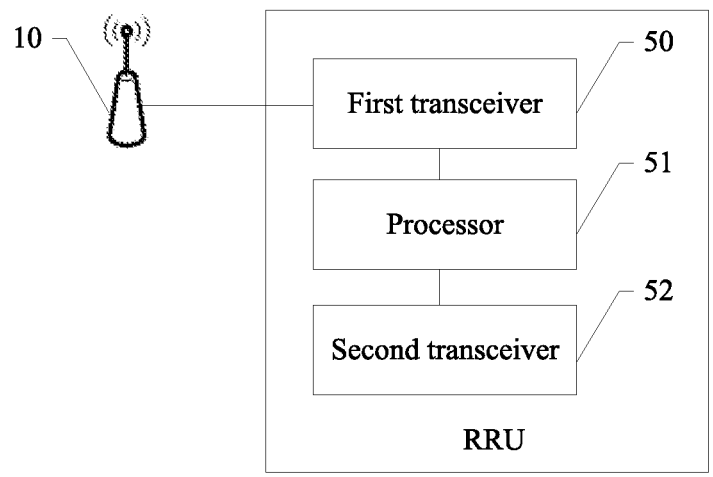
FIG. 5 is a schematic logical structural diagram of another communication system according to an embodiment of the present disclosure.

Referring to the RRU in a communication system shown in FIG. 5, an embodiment of the present disclosure further provides an RRU, including a first transceiver 50, a processor 51 and a second transceiver 52. The RRU may be applied in the RRU in the system shown in FIG. 3. When being applied in the communication system shown in FIG. 3 or FIG. 5, the first transceiver 50 of the RRU is connected to a master base station 10, and the second transceiver 52 is connected to a user equipment, where the master base station may be a master base station in the system shown in FIG. 3. Optionally, both the first transceiver 50 and the second transceiver 52 may realize data receiving and sending by using an antenna (not shown in the figure), which will not be described hereafter.

The first transceiver 50, the processor 51 and the second transceiver 52 in this embodiment comply with at least one of the following two cases.

(1) The first transceiver 50 is configured to receive downlink data sent by the master base station 10; the processor 51 is configured to convert the downlink data received by the first transceiver 50 into air interface downlink vector data and convert the air interface downlink vector data into analog data. The second transceiver 52 is configured to send the analog data converted by the processor 51 to the user equipment.

(2) The second transceiver 52 is further configured to receive uplink data sent by the user equipment. The processor 51 is configured to convert the uplink data received by the second transceiver 52 into air interface uplink vector data, demodulate and decapsulate the air interface uplink vector data, and output the decapsulated uplink data, that is, recover an original Internet Protocol (IP) packet. The first transceiver 50 is further configured to send the uplink data decapsulated by the processor 51 to the master base station 10.

Optionally, the first transceiver 50 in this embodiment may be connected to the master base station 10 by using a network rather than a fiber.

The RRU of this embodiment may independently perform Layer 1 and Layer 2 baseband processing for the uplink data and the downlink data by using the processor. For example, the RRU may demodulate and decapsulate the uplink data and convert the downlink data into air interface downlink vector data. Compared with the case in the prior art where a plurality of RRUs converts the uplink data into vector data and centralize the vector data in one base station to perform Layer 1 and Layer 2 processing, performing Layer 1 and Layer 2 processing respectively by each RRU in this embodiment reduces the burden of the master base station in performing Layer 1 and Layer 2 processing.

Figure 6:
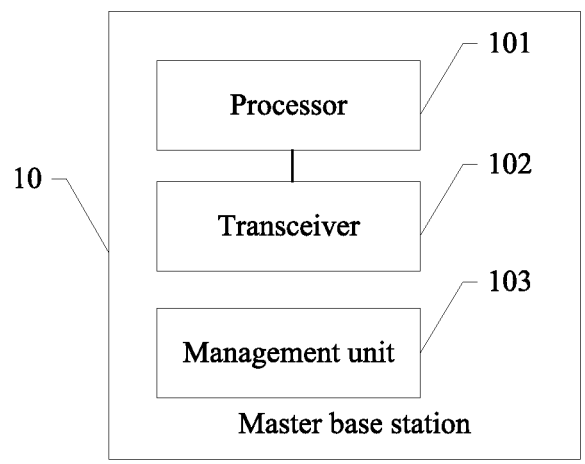
FIG. 6 is a schematic logical structural diagram of a master base station according to an embodiment of the present disclosure.

Referring to a master base station in a communication system shown in FIG. 6, the master base station 10 in the communication system may further include a transceiver 101 and a processor 102.

For example, the transceiver 101 and the processor 102 in this embodiment comply with at least one of the following cases.

(1) The transceiver 101 is configured to receive downlink data sent by a core network; the processor 102 is configured to encapsulate the downlink data. For example, the processor 102 may encapsulate the downlink data according to a certain definition or a certain standard protocol. The transceiver 101 is further configured to send the downlink data encapsulated by the processor 102 to a slave base station. The slave base station corresponds to a transmission channel identifier of the downlink data. A cell controlled by the slave base station is included in cells controlled by the master base station. Alternatively, the transceiver 101 is further configured to send the downlink data encapsulated by the processor 102 to an RRU. The RRU corresponds to the transmission channel identifier of the downlink data, where a cell controlled by the RRU is included in the cells controlled by the master base station.

(2) The transceiver 101 in this embodiment is further configured to receive uplink data sent by the slave base station or the RRU connected to the master base station. The processor 102 encapsulates the uplink data. For example, the processor 102 may encapsulate the uplink data according to a certain definition or a certain standard protocol. The transceiver 101 is further configured to send the encapsulated uplink data to the core network.

In this embodiment, the transceiver 101 of the master base station may be connected to at least one slave base station shown in FIG. 4, and a cell controlled by the slave base stations is included in the cells controlled by the master base station. Moreover, the transceiver 101 may be respectively connected to the RRUs shown in FIG. 5. In this case, the cell controlled by the RRU is included in the cells controlled by the master base station. Moreover, the master base station in this embodiment re-encapsulates the uplink data and the downlink data, and forwards the uplink data and the downlink data, rather than perform other processing for the uplink data and the downlink data.

Further, the master base station in this embodiment may further include a management unit 103. If the slave base station shown in FIG. 4 is connected to the master base station directly, the management unit 103 is configured to manage information of at least one slave base station connected to the master base station, the information including information of a cell controlled by the slave base station and information of the RRU connected to the slave base station. If the RRU shown in FIG. 5 is connected to the master base station directly, the management unit 103 is configured to manage information of at least one RRU connected to the master base station, the information including information of a cell controlled by the RRU.

The management unit 103 of the master base station in this embodiment may further detect signals of a plurality of cells controlled by the master base station and store information reported from the plurality of cells.

Figure 7:
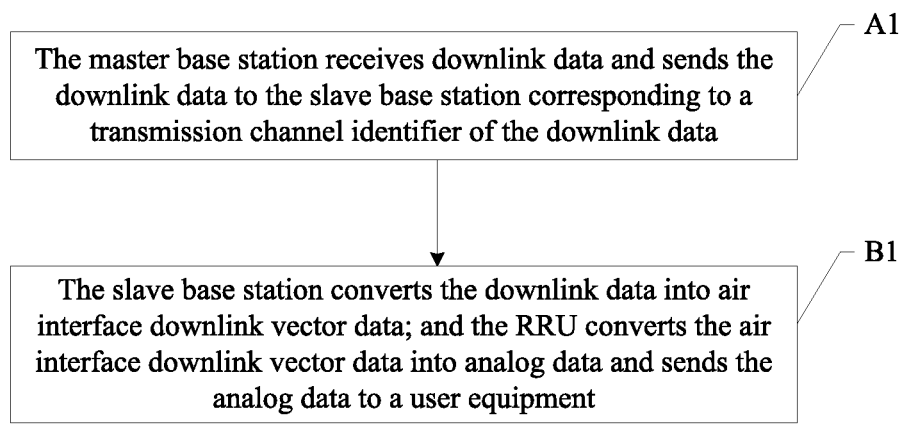
FIG. 7 is a flow chart of a communication method according to an embodiment of the present disclosure.

An embodiment of the present disclosure further provides a communication method applied in the system shown in FIG. 2, that is, a system including a master base station, a slave base station and an RRU, where a cell controlled by the slave base station is included in cells controlled by the master base station. That is, the cell controlled by the slave base station is one of a plurality of cells controlled by the master base station, or the cell controlled by the slave base station is a part of a cell controlled by the master base station. A flow chart of the method of this embodiment is shown in FIG. 7, including the following steps.

A1: receiving, by the master base station, downlink data, and sending the downlink data to the slave base station, where the slave base station corresponds to a transmission channel identifier of the downlink data.

B1: converting, by the slave base station, the downlink data into air interface downlink vector data, and sending the air interface downlink vector data to the RRU; and converting, by the RRU, the air interface downlink vector data into analog data, and sending the analog data to a user equipment.

Understandably, the master base station, after receiving downlink data sent by a core network, may encapsulate the downlink data according to a certain definition or a certain standard protocol, and send the encapsulated downlink data to the corresponding slave base station. The slave base station may forward the received downlink data to an air interface protocol stack in a data transmission apparatus, and the air interface protocol stack performs L1 baseband processing for the downlink data to generate air interface downlink vector data and send the air interface downlink vector data to the RRU, and the RRU converts the air interface downlink vector data into analog data and sends the analog data by air interface.

Further, the method in this embodiment may further include: converting, by the RRU, uplink data sent by the user equipment into air interface uplink vector data, and sending the air interface uplink vector data to the slave base station; demodulating and decapsulating, by the slave base station, the air interface uplink vector data, and sending the air interface uplink vector data to the master base station; and forwarding, by the master base station, the uplink data sent by the slave base stations.

For example, when the RRU receives the uplink data that is sent by air interface by the user equipment, the RRU converts the uplink data into air interface uplink vector data and sends the air interface uplink vector data to the slave base stations. The slave base station demodulates the air interface uplink vector data in Layer 1 and decapsulates the air interface uplink vector data by using an air interface protocol stack of Layer 2, and sends the demodulated and decapsulated air interface uplink vector data to the master base station. The master base station encapsulates the uplink data sent by the slave base stations according to a certain definition or a certain standard protocol, and sends the uplink data to the core network.

In the communication method according to this embodiment, the slave base station and the RRU are connected by using a fiber. Moreover, no absolute sequence relationship is defined between step A1 and step B1. Step A1 and step B1 may be performed simultaneously or in sequence. FIG. 7 illustrates only a specific implementation method.

The master base station in this embodiment may further manage information of at least one slave base station, the information including information of a cell controlled by the slave base station, information of the RRU connected to the slave base station, and the like.

Figure 8:
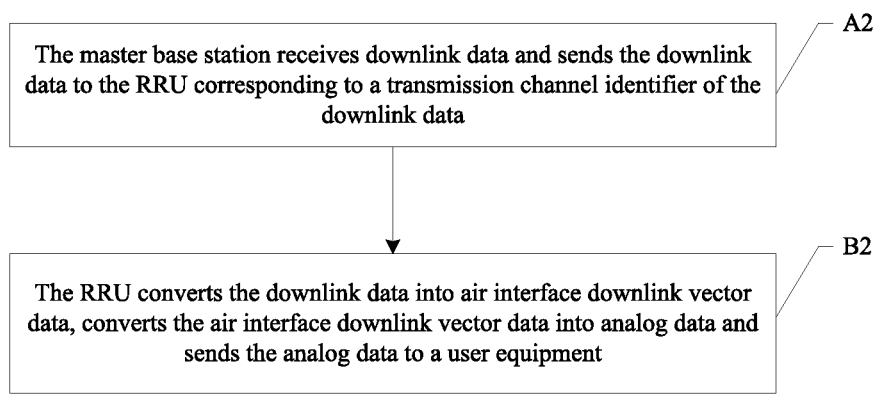
FIG. 8 is a flow chart of another communication method according to an embodiment of the present disclosure.

An embodiment of the present disclosure further provides a communication method applied in the system shown in FIG. 3, that is, a system including a master base station and at least one RRU, where a cell controlled by the RRU is included in cells controlled by the master base station. That is, the cell controlled by the RRU is one of a plurality of cells controlled by the master base station, or the cell controlled by the RRU is a part of a cell controlled by the master base station. A flow chart of the method of this embodiment is shown in FIG. 8, including the following steps.

A2: receiving, by the master base station, downlink data, and sending the downlink data to the RRU, where the RRU corresponds to a transmission channel identifier of the downlink data; and B2: converting, by the RRU, the downlink data into air interface downlink vector data, converting the air interface downlink vector data into analog data, and sending the analog data to a user equipment.

Understandably, the master base station, after receiving the downlink data sent by a core network, may encapsulate the downlink data according to a certain definition or a certain standard protocol, and send the encapsulated downlink data to the corresponding RRU. The RRU may forward the received downlink data to an air interface protocol stack in a data transmission apparatus, and the air interface protocol stack performs L1 baseband processing for the downlink data to generate air interface downlink vector data, converts the air interface downlink vector data into analog data and sends the analog data by air interface.

Further, the method in this embodiment may further include: converting, by the RRU, the uplink data sent by the user equipment into air interface uplink vector data, demodulating and decapsulating the air interface uplink vector data, and sending the demodulated and decapsulated air interface uplink vector data to the master base station; and forwarding, by the master base station, the uplink data sent by the RRU.

For example, when the RRU receives the uplink data that is sent by air interface by the user equipment, the RRU converts the uplink data into air interface uplink vector data, demodulates the air interface uplink vector data in Layer 1, decapsulates the air interface uplink vector data by using the air interface protocol stack of Layer 2, and sends the demodulated and decapsulated air interface uplink vector data to the master base station. The master base station encapsulates the uplink data sent by the RRU according to a certain definition or a certain standard protocol, and sends the uplink data to the core network.

In this embodiment, the master base station and the RRU may be connected by using a network. Moreover, no absolute sequence relationship is defined between step A2 and step B2. Step A2 and step B2 may be performed simultaneously or in sequence. FIG. 8 illustrates only a specific implementation method.

Further, the master base station in this embodiment may further manage the information of at least one RRU, including information of a cell controlled by the RRU and the like.

Persons of ordinary skill in the art may understand that all or part of the steps of the methods in the foregoing embodiments may be implemented by a computer program instructing relevant hardware. The program may be stored in a computer readable storage medium. The storage medium may include a ROM, a RAM, a magnetic disk, or an optical disk and the like.

The communication system, method and device provided by the embodiments of the present disclosure are described in detail. In the present disclosure, specific embodiments are used to illustrate the principles and implementation mode of the present disclosure. However, the description of the embodiments is only for ease of understanding of the method and core idea of the present disclosure. Meanwhile, persons of ordinary skills in the art can make modifications to specific implementation modes and application scope of the present disclosure according to the idea of the present disclosure. To sum up, the content of the specification shall not be understood as a limitation to the present disclosure.

What is claimed is:

1. A communication system comprising:
 a slave base station configured to communicate with a core network indirectly through a master base station, the master base station communicating with the core network and controlling a cell in a cellular network, the slave base station controlling at least a portion of the cell,
 wherein the slave base station comprises: a first transceiver configured to communicate data between the slave base station and the master base station; a second transceiver configured to communicate air interface vector data between the slave base station and a radio resource unit (RRU); and a processor functionally connected to the first transceiver and the second transceiver, the processor configured to perform Layer 1 or Layer 2 processing on the data communicated between the slave base station and the master base station to obtain the air interface vector data communicated between the slave base station and the RRU, or vice versa, wherein the RRU is a network device positioned in-between the slave base station and a terminal,
 wherein the second transceiver is configured to either send the air interface vector data to the terminal indirectly through the RRU or to receive the air interface vector data from the terminal indirectly through the RRU, wherein the air interface vector data is converted into the uplink data by the processor.

2. The system according to claim 1, wherein the communication system further comprises the RRU, the RRU being configured to communicate with the terminal by air interface and to:
 receive the air interface vector data from the second transceiver, convert the air interface vector data into analog data, and send the analog data to the terminal; or
 receive analog data from the terminal, convert the analog data into the air interface vector data, and send the air interface vector data to the slave base station.

3. The system according to claim 1, wherein the slave base station is further configured to communicate with the RRU via the second transceiver and a fiber.

4. The system according to claim 1, wherein the slave base station is positioned within a pre-set distance from the RRU, and wherein the master base station is positioned outside the pre-set distance from the RRU.

5. The system according to claim 1, wherein the slave base station is further configured to connect to the master base station via the first transceiver using a fiber.

6. The system according to claim 1, wherein the master base station is further configured to manage information of the slave base station, the information of the slave base station including information of at least the portion of the cell controlled by the slave base station.

7. The system according to claim 1, wherein the terminal does not communicate directly with the master base station.

8. The system according to claim 1, wherein the terminal communicates in directly with the slave base station via the RRU.

9. The system according to claim 8, wherein the terminal does not communicate directly with the slave base station.

10. A slave base station configured to communicate with a core network indirectly through a master base station, the master base station communicating with the core network and controlling a cell in a cellular network, the slave base station controlling at least a portion of the cell, the slave base station comprising:
 a first transceiver configured to communicate data between the slave base station and the master base station;
 a second transceiver configured to communicate air interface vector data between the slave base station and a radio resource unit (RRU); and
 a processor functionally connected to the first transceiver and the second transceiver, the processor being configured to perform Layer 1 or Layer 2 processing on the data communicated between the slave base station and the master base station to obtain the air interface vector data communicated between the slave base station and the RRU, or vice versa, wherein the RRU is a network device positioned in-between the slave base station and a terminal,
 wherein the second transceiver is configured either to send the air interface vector data to the terminal indirectly through the RRU or receive the air interface vector data from the terminal indirectly through the RRU, and wherein the air interface vector data is converted into the uplink data by the processor.

11. The slave base station according to claim 10, wherein the first transceiver is configured to receive downlink data from the master base station or send uplink data to the master base station; and wherein the processor is configured to convert the downlink data sent by the master base station into vector data or convert vector data into the uplink data.

12. The slave base station according to claim 10, wherein the second transceiver is further configured to communicate with the RRU via a fiber.

13. The slave base station according to claim 10, wherein the slave base station is positioned within a pre-set distance from the RRU.

14. The slave base station according to claim 10, wherein the transceiver is connected to the master base station by a fiber.

15. The slave base station according to claim 10, wherein the terminal does not communicate directly with the master base station.

16. The slave base station according to claim 10, wherein the terminal communicates in directly with the slave base station via the RRU.

17. The slave base station according to claim 16, wherein the terminal does not communicate directly with the slave base station.

18. A method of operating a slave base station, wherein the slave base station is configured to communicate to a core network indirectly through a master base station, the master base station communicating with the core network and controlling a cell in a cellular network, the slave base station controlling at least a portion of the cell, the method comprising:

communicating data between the slave base station and the master base station;

communicating air interface vector data between the slave base station and a radio resource unit (RRU), the RRU being a network device positioned in-between the slave base station and a terminal;

performing Layer 1 or Layer 2 processing on the data communicated between the slave base station and the master base station to obtain the air interface vector data communicated between the slave base station and the RRU, or vice versa; and sending or receiving the air interface vector data to or from the terminal indirectly through the RRU, wherein the air interface vector data is converted into the uplink data.

19. The method according to claim 18, wherein communicating data comprises receiving downlink data from the master base station or sending uplink data to the master base station; and wherein performing the Layer 1 or Layer 2 processing on the data converting the downlink data sent by the master base station into the air interface vector data or converting the air interface vector data into the uplink data.

20. The method according to claim 18, wherein the slave base station communicates with the master base station using a fiber.

21. The method according to claim 18, wherein the terminal does not communicate directly with the master base station.

22. The method according to claim 18, wherein the terminal communicates in directly with the slave base station via the RRU.

23. The method according to claim 22, wherein the terminal does not communicate directly with the slave base station.

24. The method of claim 18, wherein the air interface vector data is sent to the terminal indirectly through the RRU.

25. The method of claim 18, wherein the air interface vector data is received from the terminal indirectly through the RRU.

* * * * *